UNITED STATES PATENT OFFICE

ALFRED F. LESTER, OF DETROIT, MICHIGAN.

FLEXIBLE HYDRAULIC WATERPROOF COMPOUND.

1,157,234.  Specification of Letters Patent.  Patented Oct. 19, 1915.

No Drawing.  Application filed May 18, 1914.  Serial No. 839,276.

*To all whom it may concern:*

Be it known that I, ALFRED F. LESTER, a citizen of the United States, and a resident of Detroit, in the county of Wayne and State of Michigan, have invented a new and Improved Flexible Hydraulic Waterproof Compound, of which the following is a specification.

This invention relates to a mixture which will harden rapidly in water, and which, when hardened, becomes flexible and waterproof; and it consists in the combinations of substances hereinafter described and claimed. In the preparation of this mixture, I preferably first mix wheat flour or other starchy material with powdered hydrate of lime in substantially the proportion of one tablespoonful of the former to five pounds of the latter, both of these substances being dry. To this mixture, which constitutes substantially 1% of the whole, I preferably add the following ingredients in the proportions indicated (by weight): 40% of hydraulic cement, preferably Portland cement; 32% of powdered gypsum; 20% of powdered calcined gypsum; 4% of crushed raw fire-clay; and 3% of a binder such as shredded wood, after which the whole is intimately mixed in any desired way. In cases where any doubt exists as to the dryness of the elements, I preferably warm them to a low degree, say 200° Fahrenheit, to drive off the moisture. When this mixture is to be used, enough water is added to form a thick paste which may be spread under water with a trowel over foundation walls, or the sides of coffer dams to close cracks and small holes and thereby render the structure watertight. It is especially adapted for use in the salvage of wrecks, in closing holes in ships' bottoms, in which case it may be either run down through a pipe to fill molds built around the holes, or may be dumped into the space between the bottom of the ship and the bed of the lake or river, and then worked by a diver into such positions as to entirely fill the hole in the bottom. The fact that it hardens rapidly (usually in about forty minutes) and yet remains flexible, renders it of particular value in floating stranded or sunken ships and keeping them above water until they may be towed into dry-dock. The hardened mixture yields with the movement of the plates of the ship's bottom, and does not crack as do the compounds now commonly used.

It will be understood, of course, that the proportions of the various ingredients may be varied somewhat, but I prefer substantially the relative amounts stated. It may be found desirable, in some cases, to use a small quantity of some substance, such as chlorid of lime, cream of tartar or common salt, for retarding the hardening of the mixture, in order to give the user more time to work it into the proper position. While I have specified and prefer shredded wood as a bonding means, I have found that asbestos and other substances may be used.

These and various other changes I regard as within the spirit of my invention, and do not, therefore, wish to be limited otherwise than as indicated by the subjoined claims.

I claim:—

1. A flexible hydraulic waterproof compound comprising substantially forty parts of hydraulic cement, thirty-two parts of powdered gypsum, twenty parts of powdered calcined gypsum, one part of powdered hydrate of lime, and four parts of fire clay.

2. A flexible hydraulic waterproof compound comprising substantially forty per cent. of hydraulic cement, thirty-two per cent. of powdered gypsum, twenty per cent. of powdered calcined gypsum, one per cent. of powdered hydrate of lime, four per cent. of fire clay, and three per cent. of a fibrous bonding substance.

3. A flexible hydraulic waterproof compound comprising substantially forty per cent. of hydraulic cement, thirty-two per cent. of powdered gypsum, twenty per cent. of powdered calcined gypsum, one per cent. of powdered hydrate of lime, four per cent. of fire clay, and three per cent. of shredded wood.

In testimony whereof I have signed this specification in the presence of two subscribing witnesses.

ALFRED F. LESTER.

Witnesses:
L. M. SPENCER,
HUGO W. KREINBRING.

Copies of this patent may be obtained for five cents each, by addressing the "Commissioner of Patents, Washington, D. C."